US012678989B2

United States Patent

(12) United States Patent
Fukushima et al.

(10) Patent No.: US 12,678,989 B2
(45) Date of Patent: Jul. 14, 2026

(54) PRESS WORKING METHOD AND PRESS WORKING APPARATUS

(71) Applicant: HONDA MOTOR CO., LTD., Tokyo (JP)

(72) Inventors: Yasuhide Fukushima, Wako (JP); Nobuyuki Sasaki, Wako (JP); Nao Idichi, Wako (JP); Kazuki Kawamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 572 days.

(21) Appl. No.: 18/202,639

(22) Filed: May 26, 2023

(65) Prior Publication Data

US 2023/0390957 A1 Dec. 7, 2023

(30) Foreign Application Priority Data

Jun. 1, 2022 (JP) ................................. 2022-089420

(51) Int. Cl.

*B26F 1/14* (2006.01)
*B26F 1/40* (2006.01)
*B26F 1/44* (2006.01)

(52) U.S. Cl.

CPC .................. *B26F 1/14* (2013.01); *B26F 1/40* (2013.01); *B26F 1/44* (2013.01)

(58) Field of Classification Search

CPC ...... B26F 1/14; B26F 1/40; B26F 1/44; B26F 1/02; B26D 7/025; Y02E 60/50

See application file for complete search history.

(56) References Cited

U.S. PATENT DOCUMENTS 4,242,074 A * 12/1980 Lake .................. B29C 67/0044 264/321
2018/0257312 A1 9/2018 Fukushima
2019/0247906 A1 8/2019 Serizawa et al.
2020/0346268 A1 11/2020 Serizawa et al.
2021/0296663 A1 9/2021 Takano et al.

FOREIGN PATENT DOCUMENTS

CN 109843463 A 6/2019
CN 111344080 A 6/2020
JP H05-104498 A 4/1993

(Continued)

OTHER PUBLICATIONS

Taniguchi, JP 05104498 A, Espacenet machine translation, 1993 (Year: 1993).*

(Continued)

*Primary Examiner* — Adam A Arciero

(74) *Attorney, Agent, or Firm* — Carrier, Shende & Associates P.C.; Joseph P. Carrier; Jeffrey T. Gedeon

(57) ABSTRACT

A press working method for forming by a press working apparatus, in a film material made of resin, a passage hole through which a fluid for a fuel cell flows, includes a placing step, a gripping step, and a piercing step. In the piercing step, a secondary die and a holder grip an outer peripheral portion of the film material. In the piercing step, a piercing punch punches out the film material is a state in which the press working apparatus does not contact an upper surface of the film material in an adjacent portion surrounding a portion to be punched out by the piercing punch.

11 Claims, 9 Drawing Sheets

(56) References Cited

FOREIGN PATENT DOCUMENTS

| | | | |
|---|---|---|---|
| JP | 2000-312928 | A | 11/2000 |
| JP | 2018-147768 | A | 9/2018 |
| JP | 2021-153041 | A | 9/2021 |

OTHER PUBLICATIONS

Office Action with Search Report dated Nov. 1, 2025 issued in the corresponding Chinese Patent Application No. 202310641833.5 with the English translation thereof.

Office Action dated Dec. 2, 2025 issued in the corresponding Japanese Patent Application No. 2022-089420 with the English machine translation thereof.

* cited by examiner

10

10

PRESS WORKING METHOD AND PRESS WORKING APPARATUS

CROSS-REFERENCE TO RELATED APPLICATIONS

This application is based upon and claims the benefit of priority from Japanese Patent Application No. 2022-089420 filed on Jun. 1, 2022, the contents of which are incorporated herein by reference.

BACKGROUND OF THE INVENTION

Field of the Invention

The present invention relates to a press working method and a press working apparatus.

Description of the Related Art

In recent years, research and development have been conducted on fuel cells that contribute to energy efficiency in order to ensure that more people have access to affordable, reliable, sustainable and modern energy. A power generation cell for a fuel cell includes a framed MEA (Membrane Electrode Assembly) and a pair of separators sandwiching the framed MEA. The framed MEA includes an MEA and a resin film provided around an outer peripheral portion of the MEA.

The MEA includes an electrolyte membrane and a pair of electrodes disposed on both sides of the electrolyte membrane. The resin film protrudes outward from the outer peripheral portion of the MEA and extends in a frame shape so as to surround the MEA. The resin film has a plurality of passage holes through which fuel cell fluids serving as reactant gases (fuel gas and oxidant gas) and a coolant flow. Each separator has passage seal portions which extend so as to respectively surround the passage holes and are pressed against hole edge portions of the resin film surrounding respective passage holes to prevent leakage of the reactant gases and the coolant.

For example, JP 2018-147768 A discloses a press working apparatus for manufacturing a resin film of a power generation cell as described above. The press working apparatus forms a plurality of passage holes in the film material by press working on the film material. The press working apparatus includes a first die and a second die arranged to face each other. The first die has a die (first die body) that supports the film material. The second die includes a punch for forming a passage hole in the film material and a stripper. In JP 2018-147768 A, when piercing the film material to form the passage hole by the punch, the portion (adjacent portion) of the film material surrounding a portion to be punched out by the punch (portion to become the passage hole) is held between the die and the stripper.

SUMMARY OF THE INVENTION

In the conventional art described above, foreign matter may enter between the adjacent portion of the film material and the stripper when piercing is performed by the punch. Then, in the resin film of the power generation cell which is a finished product of the film material, a hole edge portion surrounding the passage hole (corresponding to the adjacent portion of the film material) may have been damaged or scratched.

An object of the present invention is to solve the aforementioned problem.

According to one aspect of the present invention, there is provided press working method for manufacturing a resin film in which a passage hole for a fluid for a fuel cell is formed by press working on a film material made of resin using a press working apparatus, the press working method comprising: placing the film material on a primary die and a secondary die disposed outside the primary die; gripping an outer peripheral portion of the film material between the secondary die and a holder after placing the film material; and piercing the film material by punching out the film material using the piercing punch to form the passage hole in the film material in a gripped state in which the outer peripheral portion of the film material is gripped by the secondary die and the holder, wherein in piercing the film material, the film material is punched out in a state in which the press working apparatus is out of contact with an upper surface of the film material in an adjacent portion surrounding a portion to be punched out by the piercing punch.

According to another aspect of the present invention, there is provided a press working apparatus configured to manufacture, by press working on a film material made of resin, a resin film having a passage hole through which a fluid for a fuel cell flows, comprising a first die and a second die arranged to face each other, the first die comprising: a primary die on which the film material is placed; a secondary die disposed outside the primary die and vertically movable with respect to the primary die; and a first biasing member configured to bias the secondary die toward the second die, the second die comprising: a piercing punch for punching out the film material to form the passage hole in the film material; a holder disposed outside the piercing punch and vertically movable with respect to the piercing punch; and a second biasing member configured to bias the holder toward the first die, wherein the secondary die and the holder are configured to grip an outer peripheral portion of the film material together, and wherein the press working apparatus is configured to be out of contact with an upper surface of the film material in an adjacent portion surrounding a portion to be punched out by the piercing punch.

According to the present invention, since the press working apparatus does not come into contact with the upper surface of the adjacent portion of the film material when the piercing punch punches out the film material, foreign matter is not pushed into the adjacent portion. Accordingly, it is possible to produce a rein film with flawless hole edge portions. In addition, since the piercing punch punches the film material in a state in which the outer peripheral portion of the film material is gripped by the secondary die and the holder, it is possible to accurately form the passage hole in the film material.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

As shown in FIGS. 4 to 9, a press working apparatus 10 according to an embodiment of the present invention is an apparatus for manufacturing a resin film 24 of a power generation cell 12 by press working on a film material 80 made of resin. First, the power generation cell 12 will be described.

Figure 1:
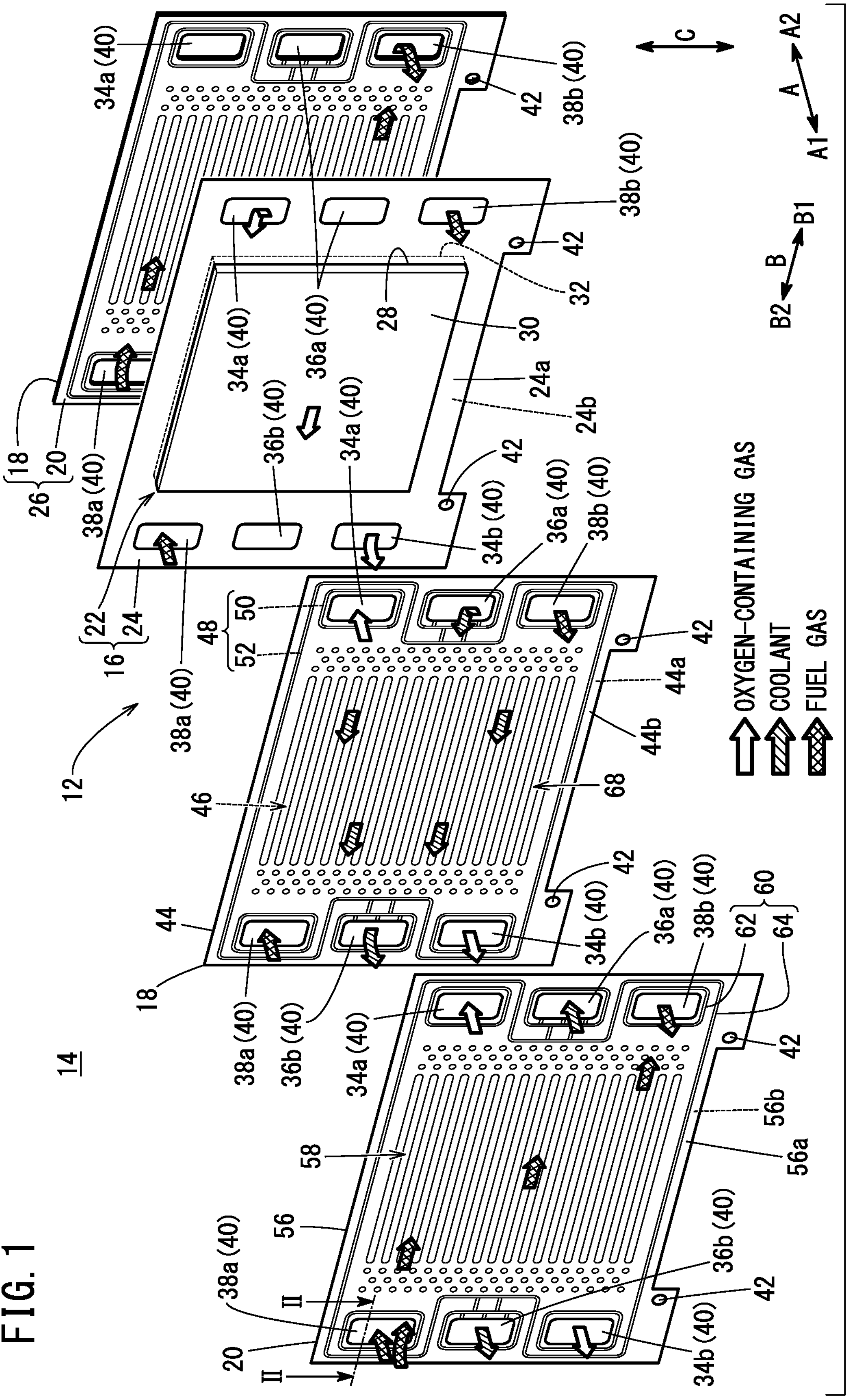
FIG. 1 is a partially omitted exploded perspective view of a fuel cell stack including a resin film manufactured by a press working method according to an embodiment of the present invention.

As shown in FIG. 1, the power generation cell 12 forms a unit cell of a fuel cell stack 14. The fuel cell stack 14 is formed by stacking a plurality of power generation cells 12 in the arrow A direction. A compression load is applied to the fuel cell stack 14 in the stacking direction of the plurality of power generation cells 12. The fuel cell stack 14 is mounted, for example, as a vehicle-incorporated fuel cell stack in a fuel cell electric vehicle (not shown).

The power generation cell 12 is laterally long. The power generation cell 12 includes a framed MEA 16, a first separator 18, and a second separator 20. The framed MEA 16 includes an MEA (membrane electrode assembly) 22 and a resin film 24.

The first separator 18 is adjacent to the framed MEA 16 on the arrow A1 side. The second separator 20 is adjacent to the framed MEA 16 on the arrow A2 side. The first separator 18 and the second separator 20 sandwich the framed MEA 16 in the arrow A direction.

The first separator 18 and the second separator 20 are joined to each other by a plurality of joining lines (not shown) to form a joint separator 26. In the state where the first separator 18 and the second separator 20 are stacked together, the outer peripheral portions of the first separator 18 and the second separator 20 are joined together by welding, brazing, crimping, etc.

The MEA 22 includes an electrolyte membrane 28, a cathode 30 and an anode 32. The electrolyte membrane 28, for example, is a polymer electrolyte membrane (cation exchange membrane). Such a polymer electrolyte membrane, for example, is a thin membrane of perfluorosulfonic acid containing water. A fluorine based electrolyte may be used as the electrolyte membrane 28. Alternatively, an HC (hydrocarbon) based electrolyte may be used as the electrolyte membrane 28. The electrolyte membrane 28 is sandwiched between the cathode 30 and the anode 32.

The resin film 24 surrounds the outer peripheral portion of the MEA 22. The resin film 24 has electrical insulation properties. Examples of materials of the resin film 24 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

One end of the longer side (one end on the arrow B1 side) of the power generation cell 12 is provided with an oxygen-containing gas supply passage 34*a*, a coolant supply passage 36*a*, and a fuel gas discharge passage 38*b*. The oxygen-containing gas supply passage 34*a*, the coolant supply passage 36*a*, and the fuel gas discharge passage 38*b* are arranged along the shorter side of the power generation cell 12 (in the arrow C direction).

An oxygen-containing gas flows through the oxygen-containing gas supply passage 34*a* in the direction indicated by the arrow A2. A coolant (for example, pure water, ethylene glycol, oil, or the like) flows through the coolant supply passage 36*a* in the direction indicated by the arrow A2. A fuel gas (for example, a hydrogen-containing gas) flows through the fuel gas discharge passage 38*b* in the direction indicated by the arrow A1.

The other end of the longer side (the other end on the arrow B2 side) of the power generation cell 12 is provided with a fuel gas supply passage 38*a*, a coolant discharge passage 36*b*, and an oxygen-containing gas discharge passage 34*b*. The fuel gas supply passage 38*a*, the coolant discharge passage 36*b*, and the oxygen-containing gas discharge passage 34*b* are arranged in the direction indicated by the arrow C.

The fuel gas flows through the fuel gas supply passage 38*a* in the direction indicated by the arrow A2. The coolant (cooling medium) flows through the coolant discharge passage 36*b* in the direction indicated by the arrow A1. The oxygen-containing gas flows through the oxygen-containing gas discharge passage 34*b* in the direction indicated by the arrow A1.

Hereinafter, the oxygen-containing gas supply passage 34*a*, the oxygen-containing gas discharge passage 34*b*, the coolant supply passage 36*a*, the coolant discharge passage 36*b*, the fuel gas supply passage 38*a*, and the fuel gas discharge passage 38*b* are simply referred to as "passage holes 40" when they are not distinguished from each other. The passage holes 40 are formed in each of the first separator 18, the resin film 24, and the second separator 20. The arrangement, shape, and size of the passage holes 40 may be appropriately set in accordance with required specifications.

A plurality of positioning holes 42 are formed in the outer peripheral portion of the power generation cell 12. Each positioning hole 42 is formed in a circular shape. The positioning hole 42 is formed in each of the first separator 18, the resin film 24, and the second separator 20. A positioning pin (not shown) is inserted into each of the plurality of positioning holes 42 when the framed MEAs 16 and the joint separators 26 are alternately stacked. The size, position, and shape of the positioning holes 42 can be set as appropriate.

The first separator 18 includes a plate-shaped first separator main body 44. The first separator main body 44 is, for example, a thin metal plate such as a steel plate, a stainless steel plate, or an aluminum plate. The surface of the first separator main body 44 may be subjected to anti-corrosion surface treatment. The first separator main body 44 is formed in a rectangular shape.

The first separator main body 44 has a surface facing the framed MEA 16 (hereinafter referred to as a "surface 44*a*"). The surface 44*a* includes an oxygen-containing gas flow field 46 extending along the longer side of the power generation cell 12 (the arrow B direction). The oxygen-containing gas flow field 46 is in fluid communication with the oxygen-containing gas supply passage 34*a* and the oxygen-containing gas discharge passage 34*b*. The oxygen-containing gas is supplied to the cathode 30 from the oxygen-containing gas flow field 46.

A first seal portion 48 for preventing leakage of the fluid which is a reactant gas (oxygen-containing gas or fuel gas) or a coolant is provided on the surface 44*a* of the first separator main body 44. The first seal portion 48 extends linearly when viewed in the separator thickness direction (the arrow A direction). However, the first seal portion 48 may extend in a wavy shape when viewed from the separator thickness direction.

Figure 2:
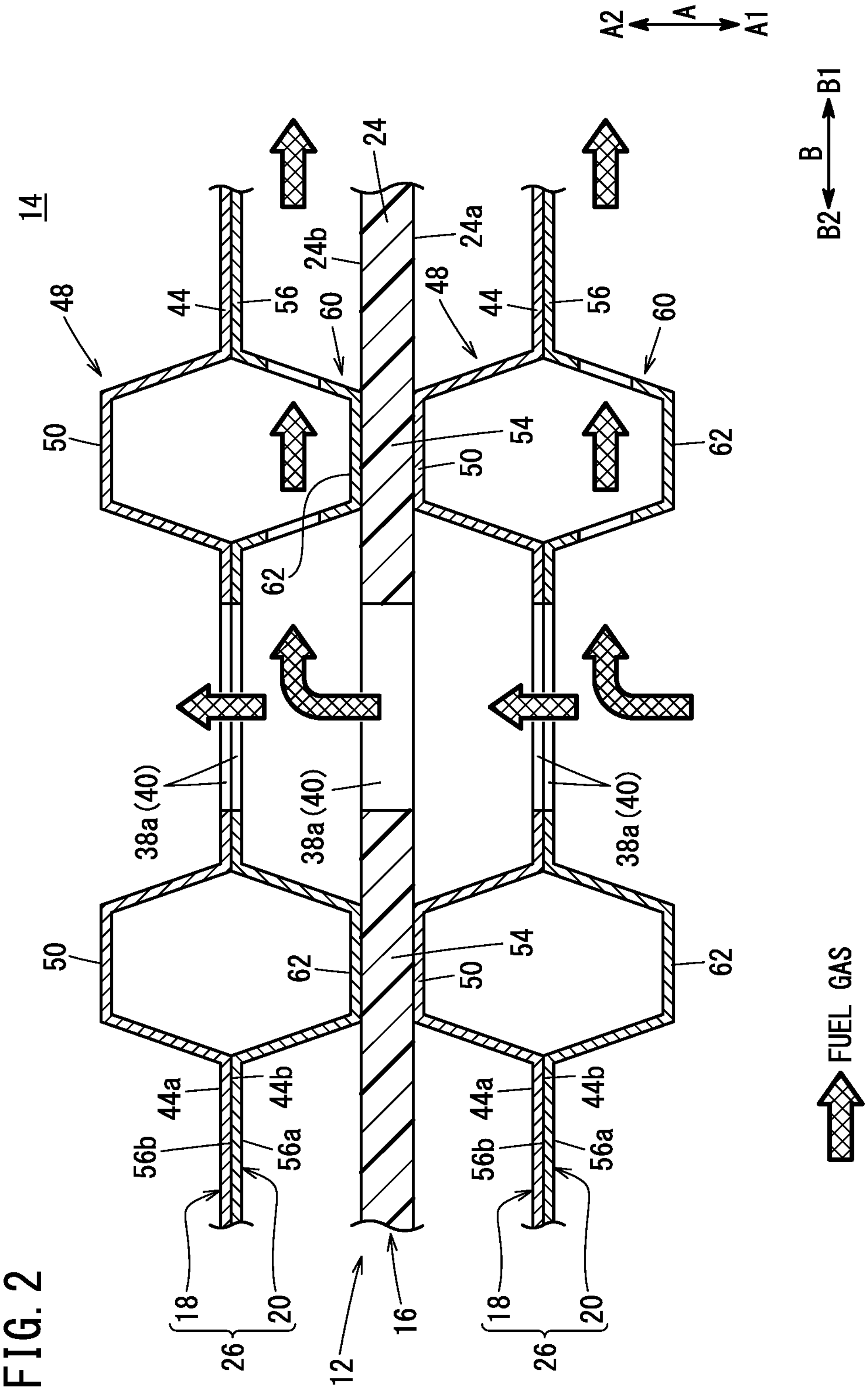
FIG. 2 is a cross sectional view taken along a line II-II in FIG. 1.

The first seal portion 48 is formed by press-forming the first separator main body 44 so as to have a trapezoidal or quadrangular cross section (see FIG. 2). The first seal portion 48 protrudes from the first separator main body 44 toward the resin film 24. A resin material may be applied to the protruding end surface of the first seal portion 48. Further, the first seal portion 48 is not limited to a so-called metal bead seal, and may be a rubber seal. The first seal portion 48 includes a plurality of first passage hole sealing portions 50 and a first flow field sealing portion 52. The plurality of first passage hole sealing portions 50 individually surround the plurality of passage holes 40.

In FIG. 2, the first passage hole sealing portions 50 are in contact with one surface 24*a* of the resin film 24. In other words, the first passage hole sealing portions 50 are in contact with hole edge portions 54 of the resin film 24 surrounding the passage holes 40 (see FIG. 2). As shown in FIG. 1, the first flow field sealing portion 52 is provided on the outer peripheral portion of the first separator main body 44.

The second separator 20 includes a plate-shaped second separator main body 56. The second separator main body 56 is, for example, a thin metal plate such as a steel plate, a stainless steel plate, or an aluminum plate. The surface of the second separator main body 56 may be subjected to anti-corrosion surface treatment. The second separator main body 56 is formed in a rectangular shape.

The second separator main body 56 has a surface facing the framed MEA 16 (hereinafter referred to as a "surface 56*a*"). The surface 56*a* includes a fuel gas flow field 58 extending along the longer side of the power generation cell 12 (the arrow B direction). The fuel gas flow field 58 fluidly communicates with the fuel gas supply passage 38*a* and the fuel gas discharge passage 38*b*. The fuel gas is supplied to the anode 32 from the fuel gas flow field 58.

A second seal portion 60 for preventing leakage of the fluid which is a reactant gas (oxygen-containing gas or fuel gas) or a coolant is provided on a surface 56*a* of the second separator main body 56. The second seal portion 60 extends linearly when viewed in the separator thickness direction (the arrow A direction). However, the second seal portion 60 may extend in a wavy shape when viewed from the separator thickness direction.

The second seal portion 60 is formed by press-forming the second separator main body 56 so as to have a trapezoidal or quadrangular cross section (see FIG. 2). The second seal portion 60 protrudes from the second separator main body 56 toward the resin film 24. A resin material may be applied to the protruding end surface of the second seal portion 60. Further, the second seal portion 60 is not limited to a so-called metal bead seal, and may be a rubber seal. The second seal portion 60 includes a plurality of second passage hole sealing portions 62 and a second flow field sealing portion 64. The plurality of second passage hole sealing portions 62 individually surround the plurality of passage holes 40.

In FIG. 2, the second passage hole sealing portions 62 are in contact with the other surface 24*b* of the resin film 24. In other words, the second passage hole sealing portions 62 are in contact with the hole edge portions 54 of the resin film 24 adjacent to the passage holes 40 (see FIG. 2). As shown in FIG. 1, the second flow field sealing portion 64 is provided on the outer peripheral portion of the second separator main body 56.

A coolant flow field 68 that fluidly communicates with the coolant supply passage 36*a* and the coolant discharge passage 36*b* is formed between the surface 44*b* of the first separator main body 44 and the surface 56*b* of the second separator main body 56 that are joined to each other.

The power generating cell 12, which is configured as described above, operates in the following manner.

First, as shown in FIG. 1, the fuel gas is supplied to the fuel gas supply passage 38*a*. The oxygen-containing gas is supplied to the oxygen-containing gas supply passage 34*a*. The coolant is supplied to the coolant supply passage 36*a*.

The fuel gas is guided from the fuel gas supply passage 38*a* into the fuel gas flow field 58 of the second separator 20. The fuel gas is supplied to the anode 32 of the MEA 22 while flowing through the fuel gas flow field 58 in the arrow B1 direction.

The oxygen-containing gas flows from the oxygen-containing gas supply passage 34*a* into the oxygen-containing gas flow field 46 of the first separator 18. The oxygen-containing gas is supplied to the cathode 30 of the MEA 22 while flowing through the oxygen-containing gas flow field 46 in the arrow B2 direction.

In each MEA 22, the oxygen-containing gas supplied to the cathode 30 and the fuel gas supplied to the anode 32 are consumed by the electrochemical reaction. As a result, power generation is performed. Then, a remainder of the fuel gas after having been supplied to and consumed at the anode 32 is discharged as the fuel off gas from the fuel gas flow field 58 to the fuel gas discharge passage 38*b*. A remainder of the oxygen-containing gas after having been supplied to and consumed at the cathode 30 is discharged as the oxygen-containing off gas from the oxygen-containing gas flow field 46 to the oxygen-containing gas discharge passage 34*b*.

The coolant supplied to the coolant supply passage 36*a* is introduced into the coolant flow field 68 formed between the first separator 18 and the second separator 20. After being introduced into the coolant flow field 68, the coolant flows in the arrow B direction. After cooling the MEA 22, the coolant is discharged from the coolant discharge passage 36*b*.

Next, the workpiece W to be processed by the press working apparatus 10 according to the present embodiment will be described.

Figure 3:
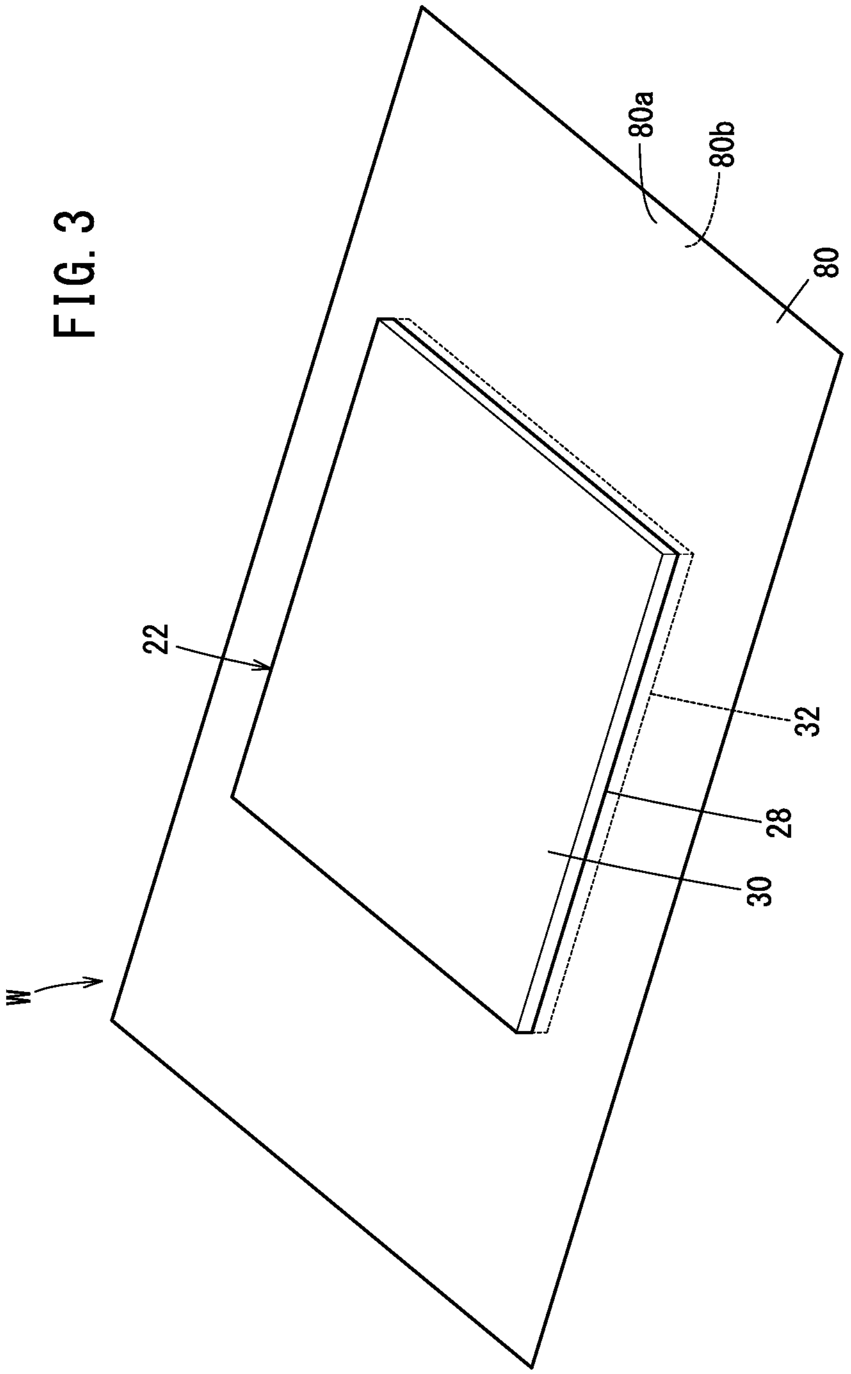
FIG. 3 is a perspective view of a workpiece.

As shown in FIG. 3, the workpiece W includes the above-described MEA 22 and the film material 80 made of resin. The film material 80 is provided on the outer peripheral portion of the MEA 22. Examples of the material of the film material 80 include the same materials as those of the resin film 24 described above. The outer end of the resin film 24 is positioned inward of the outer end of the film material 80.

Figure 4:
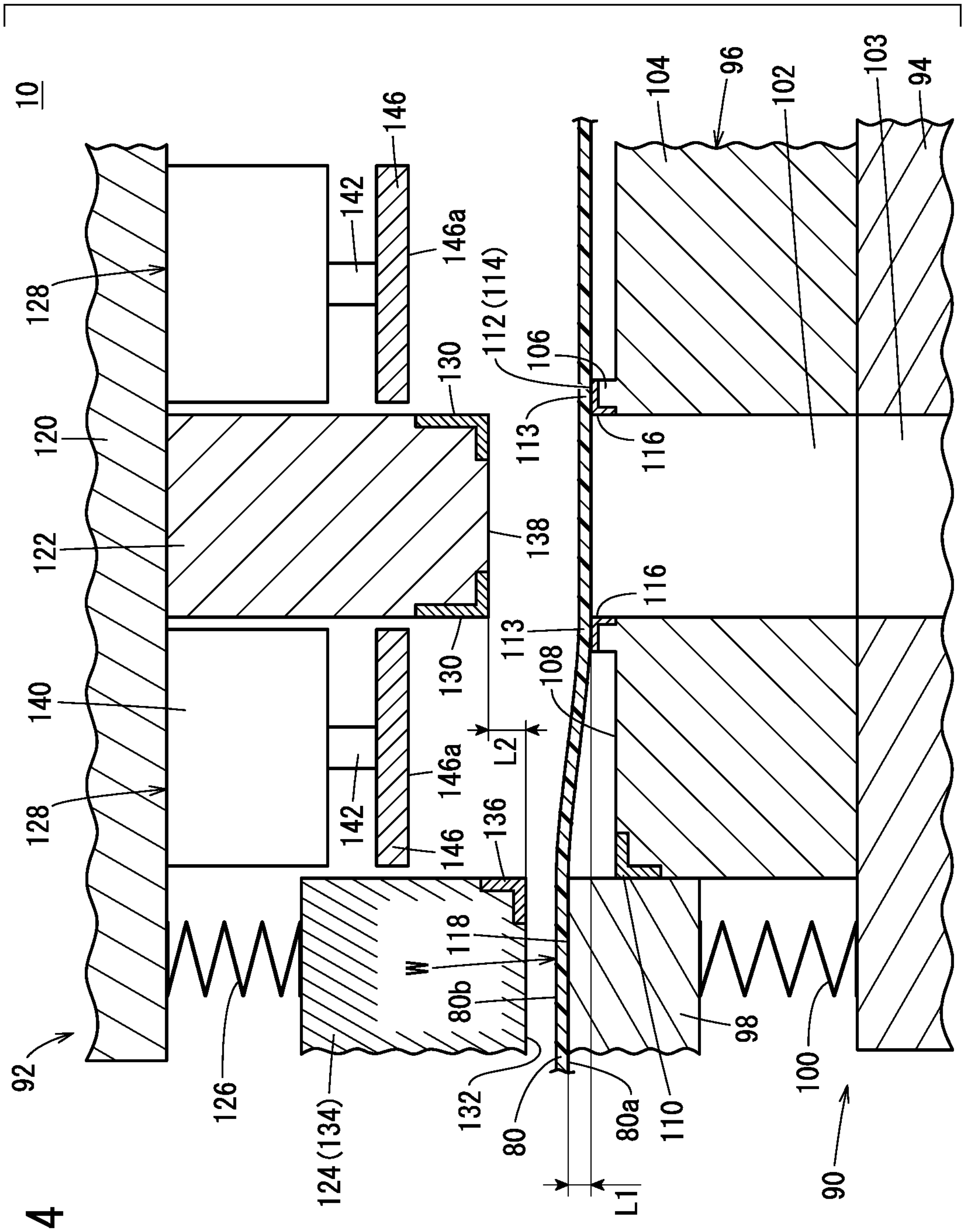
FIG. 4 is a cross-sectional explanatory view illustrating an initial state of the press working apparatus according to the embodiment of the present invention.

As shown in FIG. 4, the press working apparatus 10 performs press working on the film material 80 as the workpiece W. Specifically, the press working apparatus 10 forms the plurality of passage holes 40 and the plurality of positioning holes 42 in the film material 80 and trims the outer perimeter of the film material 80 into a predetermined shape, thereby manufacturing the above-described resin film 24 (framed MEA 16).

The press working apparatus 10 includes a first die 90 and a second die 92 which are arranged to face each other. The first die 90 is a lower die (fixed die) made of metal. The second die 92 is an upper die (movable die) made of metal. The second die 92 is movable in the vertical direction.

The first die 90 includes a die plate 94, a primary die 96, a secondary die 98, and a first biasing member 100. The primary die 96 is fixed to the die plate 94. A plurality of clearance holes 102 are formed in the primary die 96. Specifically, in the primary die 96, the same number of clearance holes 102 as the number (six) of the passage holes 40 are formed in a shape corresponding to the shape (for example, a quadrangular shape) of the passage holes 40. In addition, in the primary die 96, clearance holes 102 having a shape corresponding to the shape (circular shape) of the positioning holes 42 are also formed in the same number as the number (two) of the positioning holes 42. The clearance holes 102 communicate with the outside through, for example, holes 103 formed in the die plate 94.

The primary die 96 includes a die body 104 and a plurality of protrusions 106. The die body 104 has a flat upper surface 108. A first trimming cutter 110 is provided at an upper outer corner of the die body 104.

The first trimming cutter 110 may be integrally formed with the die body 104. In other words, the first trimming cutter 110 may be formed by thermal spraying or weld overlaying of a hard material on the die body 104.

The plurality of protrusions 106 protrude upward from the upper surface 108 of the die body 104. Each protrusion 106 extends entirely around the upper end of each of the plurality of clearance holes 102. The protruding end surface 112 of the protrusion 106 is positioned above the upper surface 108 of the die body 104. The protruding end surface 112 of the protrusion 106 is flat. The protruding end surface 112 of the protrusion 106 is a first support surface 114 that supports a lower surface of the film material 80 in an adjacent portion 113 adjacent to a portion to be punched out by a piercing punch 122 to be described later. The adjacent portion 113 corresponds to the hole edge portion 54 of the resin film 24. A first piercing cutter 116 is provided at an upper inner corner of the protrusion 106. The upper end of the first piercing cutter 116 is positioned above the upper end of the first trimming cutter 110.

The first piercing cutter 116 may be integrally formed with the protrusion 106. In other words, the first piercing cutter 116 may be formed by thermal spraying or weld overlaying of a hard material on the protrusion 106.

The secondary die 98 is arranged outside the primary die 96. The secondary die 98 may extend around the primary die 96. The secondary die 98 has a second support surface 118 that is flat and supports the outer peripheral portion of a first surface 80*a* that is one surface of the film material 80. The second support surface 118 faces the second die 92 (upward direction).

The first biasing member 100 biases the secondary die 98 upward. The first biasing member 100 is, for example, a spring. The first biasing member 100 is disposed between the secondary die 98 and the die plate 94. In the initial state of the press working apparatus 10, the second support surface 118 protrudes above the first support surface 114 by a predetermined length L1. In FIG. 4, the predetermined length L1 is shown in an exaggerated manner.

The second die 92 includes a punch plate 120, a plurality of piercing punches 122, a holder 124, a second biasing member 126, and a plurality of pressing members 128. The punch plate 120 is vertically movable along a guide pin (not shown).

The piercing punches 122 are fixed to the punch plate 120. The plurality of piercing punches 122 are positioned above the plurality of clearance holes 102. Specifically, on the punch plate 120, the piercing punches 122 having a shape corresponding to the shape (for example, a quadrangular shape) of the passage holes 40 are disposed in the same number as the number (six) of the passage holes 40. In addition, on the punch plate 120, the piercing punches 122 having a shape corresponding to the shape (circular shape) of the positioning holes 42 are also disposed in the same number as the number (two) of the positioning holes 42. Each piercing punch 122 is inserted into respective one of the clearance holes 102 when the second die 92 moves toward the first die 90. A second piercing cutter 130 is provided at a lower corner of the piercing punch 122.

The second piercing cutter 130 may be integrally formed with the piercing punch 122. In other words, the second piercing cutter 130 may be formed by thermal spraying or weld overlaying of a hard material on the piercing punch 122.

The holder 124 is positioned above the secondary die 98. The holder 124 extends so as to oppose the secondary die 98. The holder 124 has a flat pressing surface 132 that comes into contact with the outer peripheral portion of the second surface 80*b* that is the other surface of the film material 80. The pressing surface 132 extends in parallel with the second support surface 118. The pressing surface 132 extends in a direction perpendicular to the vertical direction (the moving direction of the holder 124). The holder 124 is a trimming punch 134 for trimming the outer perimeter of the film material 80. A second trimming cutter 136 is provided at a lower inner corner portion of the trimming punch 134.

The second trimming cutter 136 may be integrally formed with the trimming punch 134. In other words, the second trimming cutter 136 may be formed by thermal spraying or weld overlaying of a hard material on the trimming punch 134.

The second biasing member 126 pushes the holder 124 downward. The second biasing member 126 is, for example, a spring. The second biasing member 126 is disposed between the holder 124 and the punch plate 120. The second biasing member 126 connects the holder 124 and the punch plate 120 to each other. In the initial state of the press working apparatus 10, the pressing surface 132 protrudes downward from the lower end 138 of the piercing punch 122 by a predetermined length L2.

The pressing members 128 are provided on the punch plate 120. The pressing members 128 are disposed adjacent to the piercing punches 122 in a direction perpendicular to the vertical direction. The pressing member 128 removes, from the second die 92, the resin film 24 caught on the outer peripheral surface of the piercing punch 122 after press working on the film material 80 (finished film material 80). The pressing member 128 includes a cylinder 140, a rod 142, and a pressing plate 146.

A piston (not shown) is provided inside the cylinder 140 in a slidable manner. The piston is vertically slidable inside the cylinder 140 by compressed air supplied into the cylinder 140. A rod 142 is connected to the piston and extends downwardly from the cylinder 140. The pressing plate 146 is connected to the end portion (lower end portion) of the rod 142. The pressing plate 146 is, for example, a flat plate extending in a direction perpendicular to the vertical direction. The pressing plate 146 has a downwardly facing flat knockout surface 146*a*. In the initial state of the press working apparatus 10, the knockout surface 146*a* is positioned above the lower end 138 of the piercing punch 122.

The second die 92 is configured so as not to come into contact with the upper surface of the adjacent portion 113 of the film material 80 when the film material 80 is subjected to the press working.

Next, a press working method using the press working apparatus 10 will be described.

Figure 5:
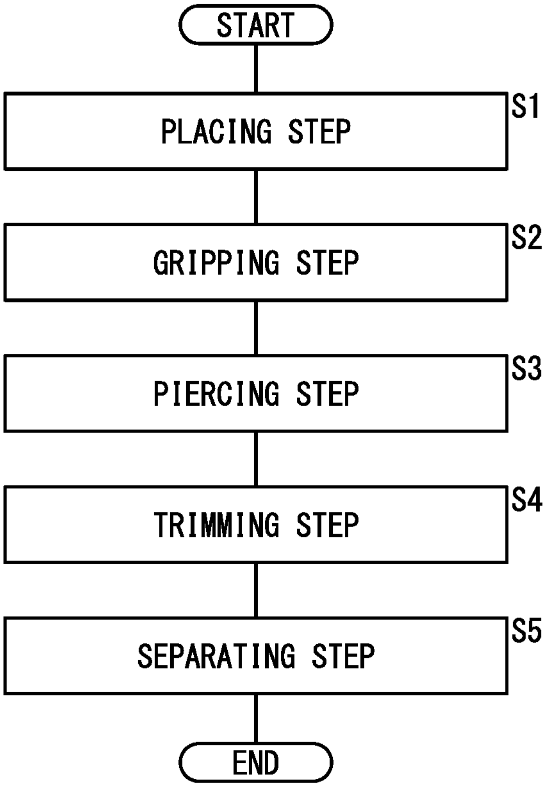
FIG. 5 is a flowchart for explaining a press working method using the press working apparatus.

As shown in FIG. 5, the press working method includes a placing step, a gripping step, a piercing step, a trimming step, and a separating step.

In the press working method, as shown in FIG. 4, the workpiece W is placed on the first die 90 in the placing step (step S1). At this time, the first surface 80*a* of the film material 80 is placed on the first support surface 114 and the second support surface 118. In other words, in the placing step, the film material 80 is placed on the protruding end surface 112 (the first support surface 114) of the protrusion 106 so as to straddle the protrusion 106 around the inner hole (the clearance hole 102).

Subsequently, the second die 92 (punch plate 120) of the press working apparatus 10 is lowered toward the first die 90. Then, the gripping step (step S2), the piercing step (step S3), and the trimming step (step S4) are sequentially performed.

Figure 6:
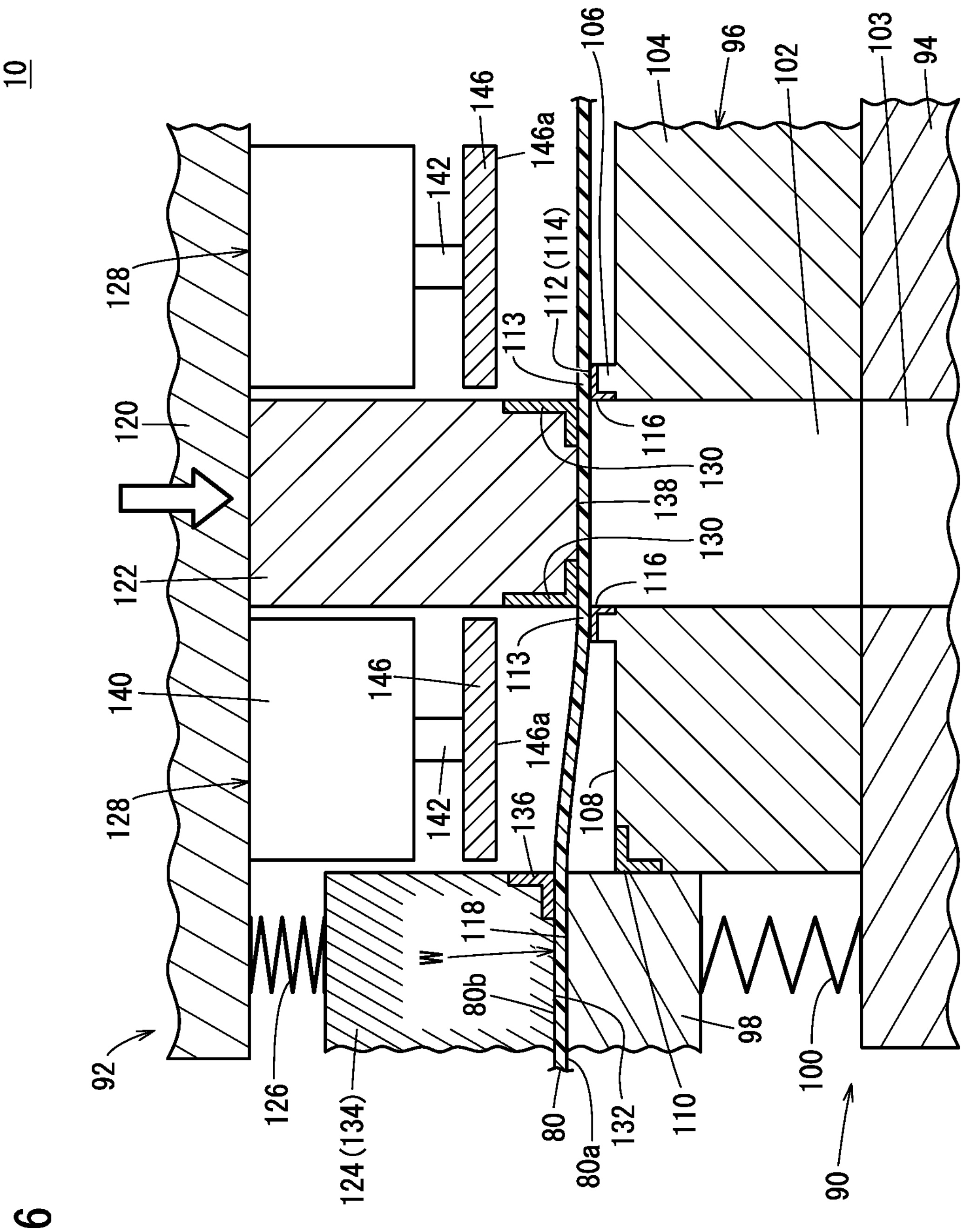
FIG. 6 is an explanatory view of a first operation of the press working method.

To be specific, when the second die 92 is lowered, as shown in FIG. 6, the pressing surface 132 of the holder 124 (the trimming punch 134) comes into contact with the outer peripheral portion of the second surface 80*b* of the film material 80. When the second die 92 is further lowered, the secondary die 98 pressed downward by the holder 124 moves downward while compressing the first biasing member 100. At this time, the inner peripheral surface of the secondary die 98 slides on the outer peripheral surface of the die body 104. The holder 124 receiving the reaction force from the secondary die 98 moves toward the punch plate 120 (upward with respect to the piercing punch 122) while compressing the second biasing member 126. As a result, the outer peripheral portion of the film material 80 is firmly held between the secondary die 98 and the holder 124 (gripping step).

In the gripping step, because the reaction force of the compressed first biasing member 100 and the reaction force of the compressed second biasing member 126 act as a gripping force on the outer peripheral portion of the film material 80, the outer peripheral portion of the film material 80 is firmly gripped by the secondary die 98 and the holder 124.

Figure 7:
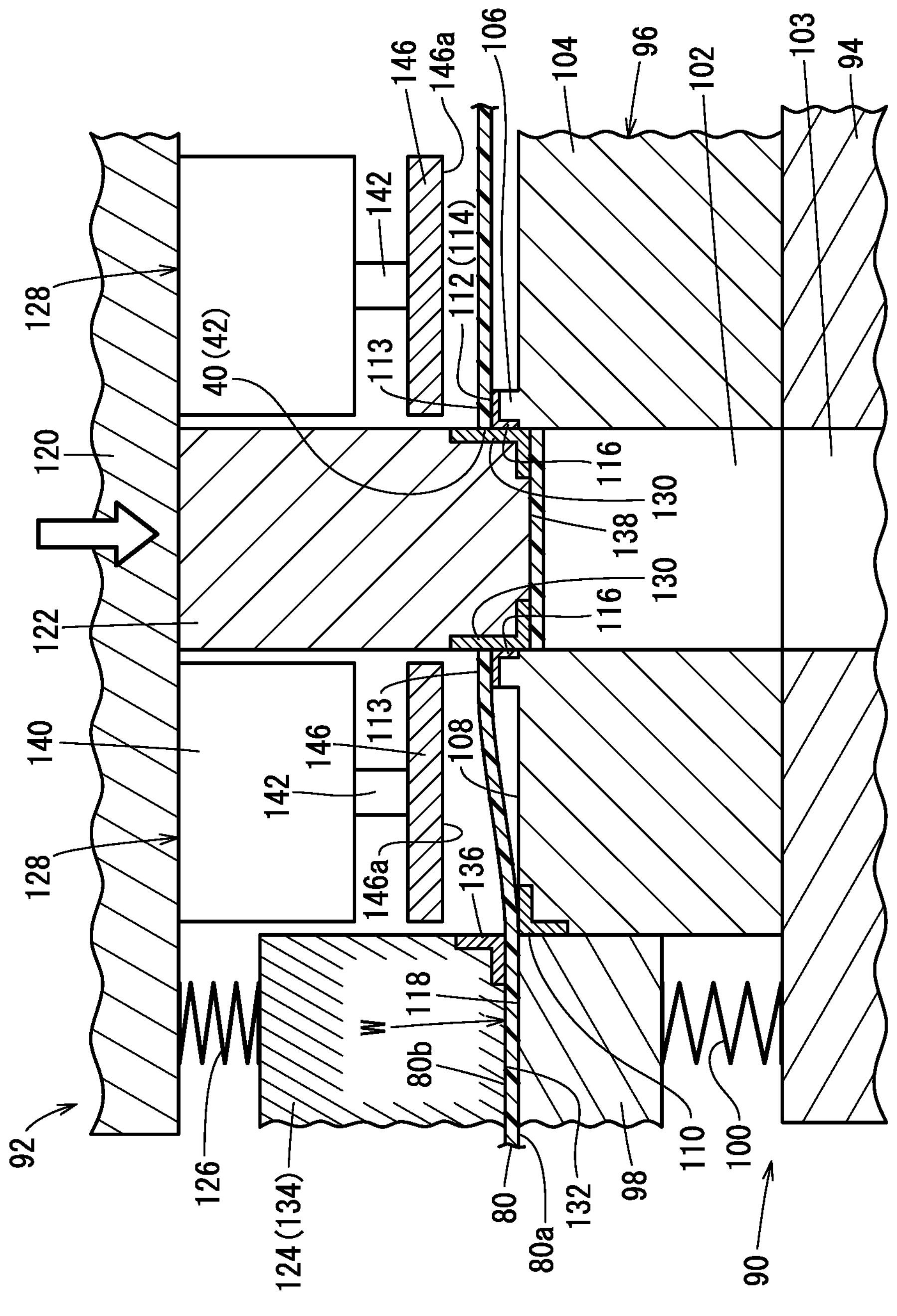
FIG. 7 is an explanatory view of a second operation of the press working method.

Thereafter, as shown in FIG. 7, the piercing punch 122 presses the second surface 80*b* of the film material 80 downward. Then, by a shearing force acting on the film material 80 between the first piercing cutter 116 and the second piercing cutter 130, holes (the passage holes 40 and the positioning holes 42) having shapes corresponding to the shapes of the piercing punches 122 are formed in the film material 80 (piercing step). In other words, the piercing punches 122 punch out the film material 80 placed on the protruding end surfaces 112 of the protrusions 106. Thus, the passage holes 40 and the positioning holes 42 are formed in the film material 80.

At this time, the secondary die 98 pushed by the holder 124 further moves downward while compressing the first biasing member 100. In addition, because the upper end of the first piercing cutter 116 is positioned above the upper end of the first trimming cutter 110, the film material 80 is not cut by the first trimming cutter 110 during the piercing step. The punched portions (scraps) are discharged from the clearance holes 102 and the holes 103.

Figure 8:
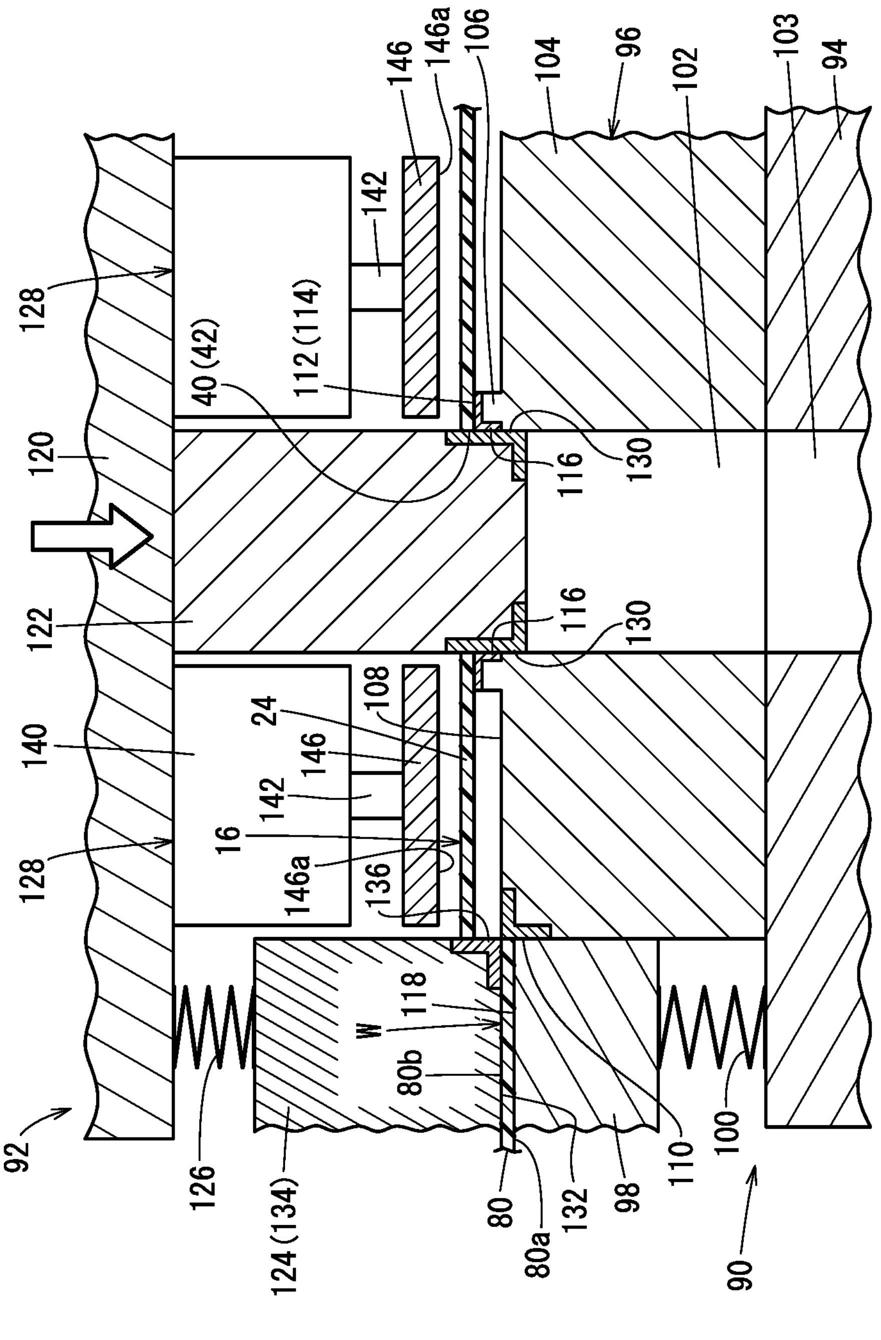
FIG. 8 is an explanatory view of a third operation of the press working method.

Subsequently, as shown in FIG. 8, the first trimming cutter 110 comes into contact with the first surface 80*a* of the film material 80. Then, a shearing force acts on the film material 80 between the first trimming cutter 110 and the second trimming cutter 136, so that the outer peripheral portion of the film material 80 is cut off (trimming step). The trimming step is initiated after completion of the piercing step. With the completion of the trimming step, the resin film 24 is produced. During the trimming step, the piercing punches 122 pass through the holes (the passage holes 40 and the positioning holes 42) formed in the film material 80 and are inserted into the clearance holes 102 in the primary die 96.

Figure 9:
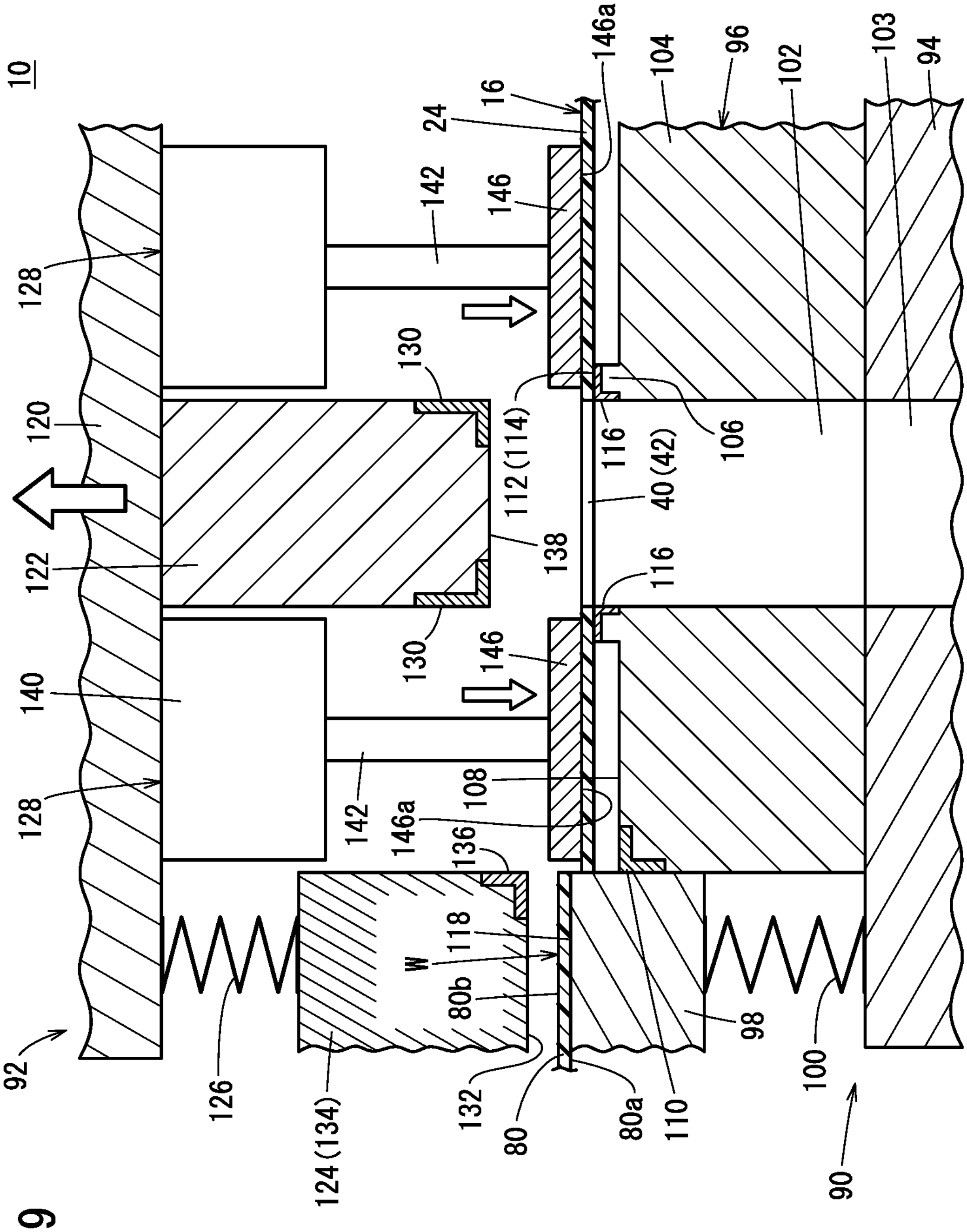
FIG. 9 is an explanatory view of a fourth operation of the press working method.

When the trimming step is completed, the second die 92 is moved upward as shown in FIG. 9. At this time, the inner surfaces of the holes (the passage holes 40 and the positioning holes 42) formed in the resin film 24 may be caught by the outer peripheral surfaces of the piercing punches 122. Therefore, the separating step is performed while moving the second die 92 upward. In the separating step, compressed air is supplied to the cylinder 140 to cause the pressing plate 146 to advance downward. Then, the resin film 24 is pressed downward by the pressing plate 146, so that the resin film 24 is removed from the piercing punches 122. At this time, in the separating step, the film material 80 is separated from the piercing punches 122 in a state where the film material 80 is gripped between the protruding end surface 112 of the protrusion 106 and the pressing plate 146. The press working method is terminated upon completion of the separating step.

The present embodiment exhibits the following advantageous effects.

According to the present embodiment, when the piercing punch 122 punches out the film material 80, the press working apparatus 10 (the second die 92) does not come into contact with the upper surface of the adjacent portion 113 of the film material 80. Therefore, foreign matter is not pushed into the adjacent portion 113. AS a result, it is possible to prevent the hole edge portion 54 of the resin film 24 from being damaged. In other words, it is possible to suppress the sealing performance of the first passage hole sealing portion 50 and the second passage hole sealing portion 62 from being lowered. In addition, because the piercing punch 122 punches out the film material 80 in a state where the outer peripheral portion of the film material 80 is gripped by the secondary die 98 and the holder 124, it is possible to form the passage holes 40 in the film material 80 with high accuracy.

The holder 124 is a trimming punch 134 for trimming the outer perimeter of the film material 80. The press working method includes a trimming step of cutting off the outer peripheral portion of the film material 80 by the trimming punch 134 and the secondary die 98 in a gripped state after completion of the piercing step.

Thus, the piercing step and the trimming step of the film material 80 can be efficiently performed. In addition, since it is not necessary to separately prepare the holder 124 and the trimming punch 134, the configuration of the press working apparatus 10 can be simplified.

The press working method includes a separating step of separating the film material 80 from the piercing punches 122 by pressing down the upper surface of the film material 80 by the pressing member 128 after completion of the trimming step.

Thus, even when the film material 80 is caught by the piercing punches 122, the film material 80 (resin film 24) can be easily removed from the piercing punches 122 by the separating step.

The separating step is performed while the piercing punches 122 are moved upward.

According to such a method, because a moving step for moving the second die 92 away from the first die 90 and the separating step are performed at the same time, the time required for the press working method can be shortened.

The primary die 96 includes a die body 104 and frame-shaped protrusions 106 protruding upward from the die body 104. In the placing step, the film material 80 is placed on the protruding end surfaces 112 of the protrusions 106 so as to straddle the inner holes of the protrusions 106. In the piercing step, the piercing punches 122 punch the film material 80 placed on the protruding end surfaces 112 of the protrusions 106. In the trimming step, the outer peripheral portion of the film material 80 is cut off by the trimming punch 134 and the die body 104.

According to such a method, with a simple configuration, the piercing step can be performed before the trimming step.

The die body 104 is formed with the clearance holes 102 for receiving the piercing punches 122. The protrusions 106 are formed on the upper surface 108 of the die body 104 so as to surround the clearance holes 102.

In this case, the passage holes 40 and the positioning holes 42 can be formed in the film material 80 with high accuracy by the piercing punches 122.

In the separating step, the film material 80 is separated from the piercing punches 122 in a state where the film material 80 is gripped between the pressing plate 146 of the pressing member 128 and the protrusion 106.

According to such a method, the film material 80 can be efficiently and reliably stripped from the piercing punches 122.

The primary die 96 includes the die body 104 and the protrusions 106. The protrusions 106 protrude upward from the die body 104 and support the adjacent portions 113. The upper surface 108 of the die body 104 is positioned lower than the protruding end surfaces 112 of the protrusions 106. In the initial state of the press working apparatus 10, the upper surface (second support surface 118) of the secondary die 98 is positioned higher than the protruding end surfaces 112 of the protrusions 106.

According to such a configuration, the holder 124 and the secondary die 98 can grip the outer peripheral portion of the film material 80 before the piercing punches 122 come into contact with the film material 80. Therefore, it is possible to punch the film material 80 with high accuracy by the piercing punches 122.

The present embodiment discloses the following contents.

The above embodiment discloses a press working method for manufacturing the resin film (24) in which a passage hole (40) for a fluid for the fuel cell is formed by press working on the film material (80) made of resin using the press working apparatus (10), the method comprising: placing the film material on the primary die (96) and the secondary die (98) disposed outside the primary die; gripping an outer peripheral portion of the film material between the secondary die and the holder (124) after placing the film material; and piercing the film material by punching out the film material using the piercing punch (122) to form the passage hole in the film material while the outer peripheral portion of the film material is gripped by the secondary die and the holder, wherein in the piercing, the film material is punched out in a state in which the press working apparatus is out of contact with the upper surface of the film material in an adjacent portion (113) surrounding a portion to be punched out by the piercing punch.

In the above-described press working method, the holder may be a trimming punch (134) for cutting off the outer peripheral portion of the film material, and the press working method may include a trimming step of cutting off, in the gripped state, the outer peripheral portion of the film material using the trimming punch and the secondary die after completion of the piercing step.

The above-described press working method may further include a separating step of separating the film material from the piercing punch by pressing down the upper surface of the film material downward by the pressing member (128) after completion of the trimming step.

In the above press working method, the piercing punch may move upward while the separating step is being performed.

In the above press working method, the primary die may include the die body (104) and the frame-shaped protrusion (106) protruding upward from the die body, the film material may be placed on the protruding end surface (112) of the protrusion so as to straddle an inner hole of the protrusion in the placing step, the piercing punch may punch the film material placed on the protruding end surface of the protrusion in the piercing step, and the outer peripheral portion of the film material may be cut off by the trimming punch and the die body in the trimming step.

In the above-described press working method, the clearance hole (102) for receiving the piercing punch may be formed in the die body, and the protrusion may protrude from the upper surface of the die body at a position adjacent to the clearance hole.

In the above-described press working method, the primary die may include a die body and a protrusion protruding upward from the die body, and in the separating step, the film material may be separated from the piercing punch in a state in which the film material is gripped by the pressing plate (146) of the pressing member and the protrusion.

The above embodiment discloses a press working apparatus configured to manufacture, by press working on a film material made of resin, a resin film having a passage hole through which a fluid for a fuel cell flows, comprising the first die (90) and the second die (92) arranged to face each other, the first die comprising a primary die on which the film material is placed, a secondary die disposed outside the primary die and vertically movable with respect to the primary die, and the first biasing member (100) configured to bias the secondary die toward the second die, the second die comprising a piercing punch configured to punch the film material to form the passage hole in the film material, a holder disposed outside the piercing punch and vertically movable with respect to the piercing punch, and the second biasing member (126) configured to bias the holder toward the first die, wherein the secondary die and the holder grip an outer peripheral portion of the film material together, and wherein the press working apparatus is configured to be out of contact with an upper surface of the film material in an adjacent portion surrounding a portion to be punched out by the piercing punch.

In the above press working apparatus, the holder may be a trimming punch, and the trimming punch and the first die may cut off the outer peripheral portion of the film material.

In the above-described press working apparatus, the primary die may include the die body and a protrusion that protrudes upward from the die body and supports the adjacent portion, the upper surface (108) of the die body may be arranged at a position lower than the protruding end surface of the protrusion, and an upper surface (118) of the secondary die may be arranged at a position higher than the protruding end surface of the protrusion in an initial state of the press working apparatus.

In the above-described press working apparatus, the secondary die may include a pressing member that presses down the film material.

Moreover, it should be noted that the present invention is not limited to the embodiment described above, and various configurations can be adopted therein without departing from the essence and gist of the present invention.

The invention claimed is:

1. A press working method for manufacturing a resin film in which a passage hole for a fluid for a fuel cell is formed by press working on a film material made of resin using a press working apparatus, the press working method comprising:

placing the film material on a primary die and a secondary die disposed outside the primary die;

gripping an outer peripheral portion of the film material between the secondary die and a holder after placing the film material; and piercing the film material by punching out the film material using the piercing punch to form the passage hole in the film material in a gripped state in which the outer peripheral portion of the film material is gripped by the secondary die and the holder, wherein in piercing the film material, the film material is punched out in a state in which the press working apparatus is out of contact with an upper surface of the film material in an adjacent portion surrounding a portion to be punched out by the piercing punch, wherein the holder is a trimming punch for cutting off the outer peripheral portion of the film material, the press working method further comprising:

trimming the film material in the gripped state by cutting off the outer peripheral portion of the film material using the trimming punch and the secondary die, after piercing the film material, wherein the primary die comprises a die body and a frame-shaped protrusion protruding upward from the die body, and wherein placing the film material comprises placing the film material on a protruding end surface of the protrusion to straddle an inner hole formed by the protrusion;

piercing the film material comprises punching out the film material placed on the protruding end surface of the protrusion by the piercing punch; and trimming the film material comprises cutting off the outer peripheral portion of the film material by the trimming punch and the die body.

2. The press working method according to claim 1, further comprising:

separating the film material from the piercing punch by pressing down the upper surface of the film material by a pressing member, after trimming the film material.

3. The press working method according to claim 2, wherein the piercing punch moves upward while the film material is being knocked to be separated from the piercing punch.

4. The press working method according to claim 1, wherein the die body comprises a clearance hole for receiving the piercing punch, and wherein the protrusion protrudes from an upper surface of the die body at a position adjacent to the clearance hole.

5. A press working method for manufacturing a resin film in which a passage hole for a fluid for a fuel cell is formed by press working on a film material made of resin using a press working apparatus, the press working method comprising:

placing the film material on a primary die and a secondary die disposed outside the primary die;

gripping an outer peripheral portion of the film material between the secondary die and a holder after placing the film material;

piercing the film material by punching out the film material using the piercing punch to form the passage hole in the film material in a gripped state in which the outer peripheral portion of the film material is gripped by the secondary die and the holder;

trimming the film material in the gripped state by cutting off the outer peripheral portion of the film material using the trimming punch and the secondary die, after piercing the film material; and separating the film material from the piercing punch by pressing down the upper surface of the film material by a pressing member, after trimming the film material, wherein in piercing the film material, the film material is punched out in a state in which the press working apparatus is out of contact with an upper surface of the film material in an adjacent portion surrounding a portion to be punched out by the piercing punch, wherein the holder is a trimming punch for cutting off the outer peripheral portion of the film material, wherein the primary die comprises a die body and a protrusion protruding upward from the die body, and wherein separating the film material comprising separating the film material from the piercing punch in a state in which the film material is gripped by a pressing plate of the pressing member and the protrusion.

6. A press working apparatus configured to manufacture, by press working on a film material made of resin, a resin film having a passage hole through which a fluid for a fuel cell flows, comprising a first die and a second die arranged to face each other, the first die comprising:

a primary die on which the film material is placed;

a secondary die disposed outside the primary die and vertically movable with respect to the primary die; and a first biasing member configured to bias the secondary die toward the second die, the second die comprising:

a piercing punch for punching out the film material to form the passage hole in the film material;

a holder disposed outside the piercing punch and vertically movable with respect to the piercing punch; and a second biasing member configured to bias the holder toward the first die, wherein the secondary die and the holder are configured to grip an outer peripheral portion of the film material together, and wherein the press working apparatus is configured to be out of contact with an upper surface of the film material in an adjacent portion surrounding a portion to be punched out by the piercing punch.

7. The press working apparatus according to claim 6, wherein the holder comprises a trimming punch, and wherein the trimming punch and the primary die are configured to cut off the outer peripheral portion of the film material.

8. The press working apparatus according to claim 6, wherein the primary die comprises: a die body; and a protrusion protruding upward from the die body and configured to support the adjacent portion, wherein an upper surface of the die body is arranged at a position lower than a protruding end surface of the protrusion, and wherein an upper surface of the secondary die is arranged at a position higher than the protruding end surface of the protrusion in an initial state of the press working apparatus.

9. The press working apparatus according to claim 7, wherein the primary die comprises: a die body; and a protrusion protruding upward from the die body and configured to support the adjacent portion, wherein an upper surface of the die body is arranged at a position lower than a protruding end surface of the protrusion, and wherein an upper surface of the secondary die is arranged at a position higher than the protruding end surface of the protrusion in an initial state of the press working apparatus.

10. The press working apparatus according to claim 6, wherein the second die further comprises a pressing member for pressing down the film material downward.

11. The press working apparatus according to claim 7, wherein the second die further comprises a pressing member for pressing down the film material downward.

* * * * *